J. E. FISHER.
BELT GUIDE.
APPLICATION FILED MAY 18, 1909.
954,618.
Patented Apr. 12, 1910.
3 SHEETS—SHEET 1.
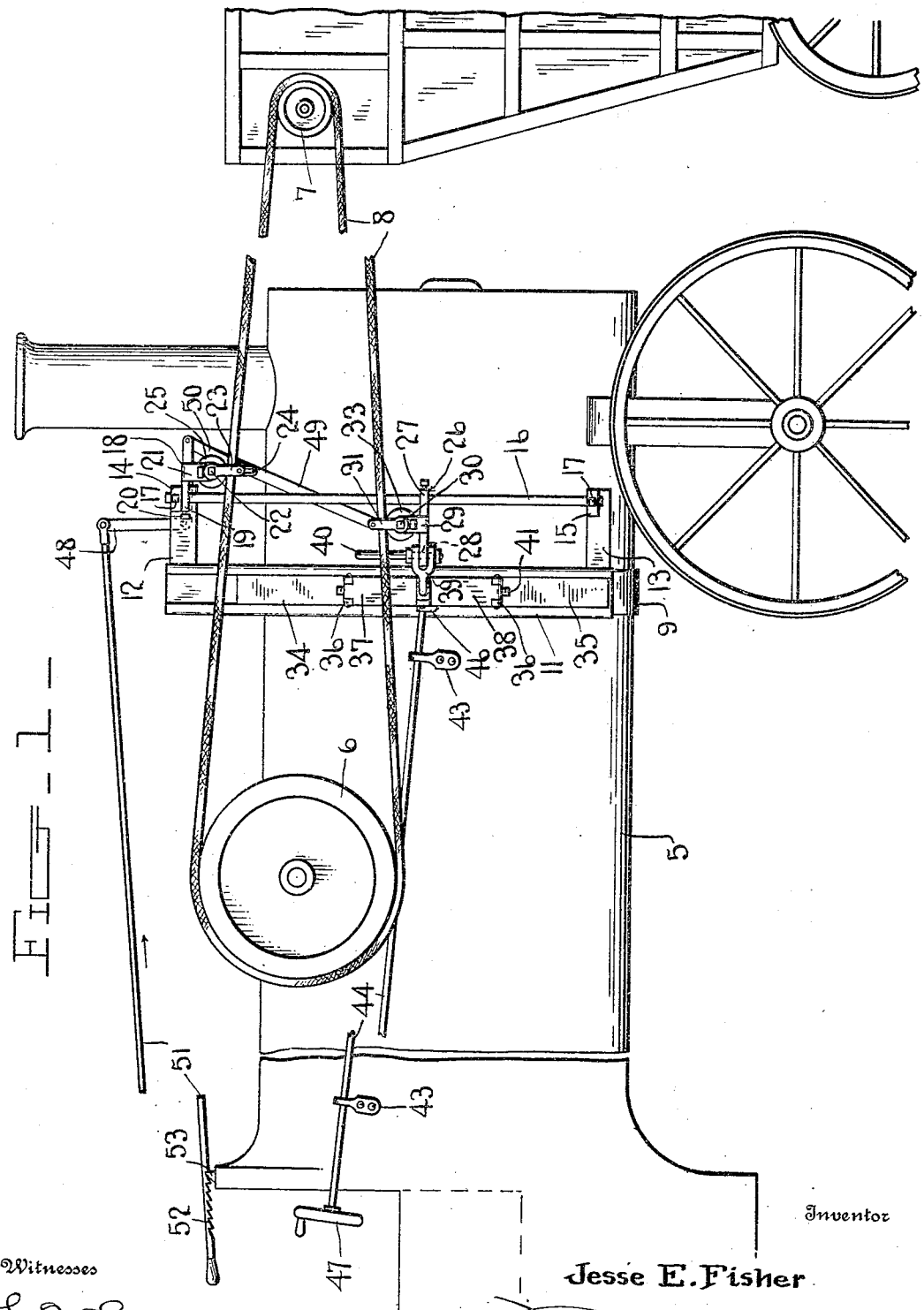
Witnesses
L. B. James
John W. Donegay
Inventor
Jesse E. Fisher
By Chandler & Chandler
Attorneys J. E. FISHER.
BELT GUIDE.
APPLICATION FILED MAY 18, 1909.
954,618.
Patented Apr. 12, 1910.
3 SHEETS—SHEET 2.
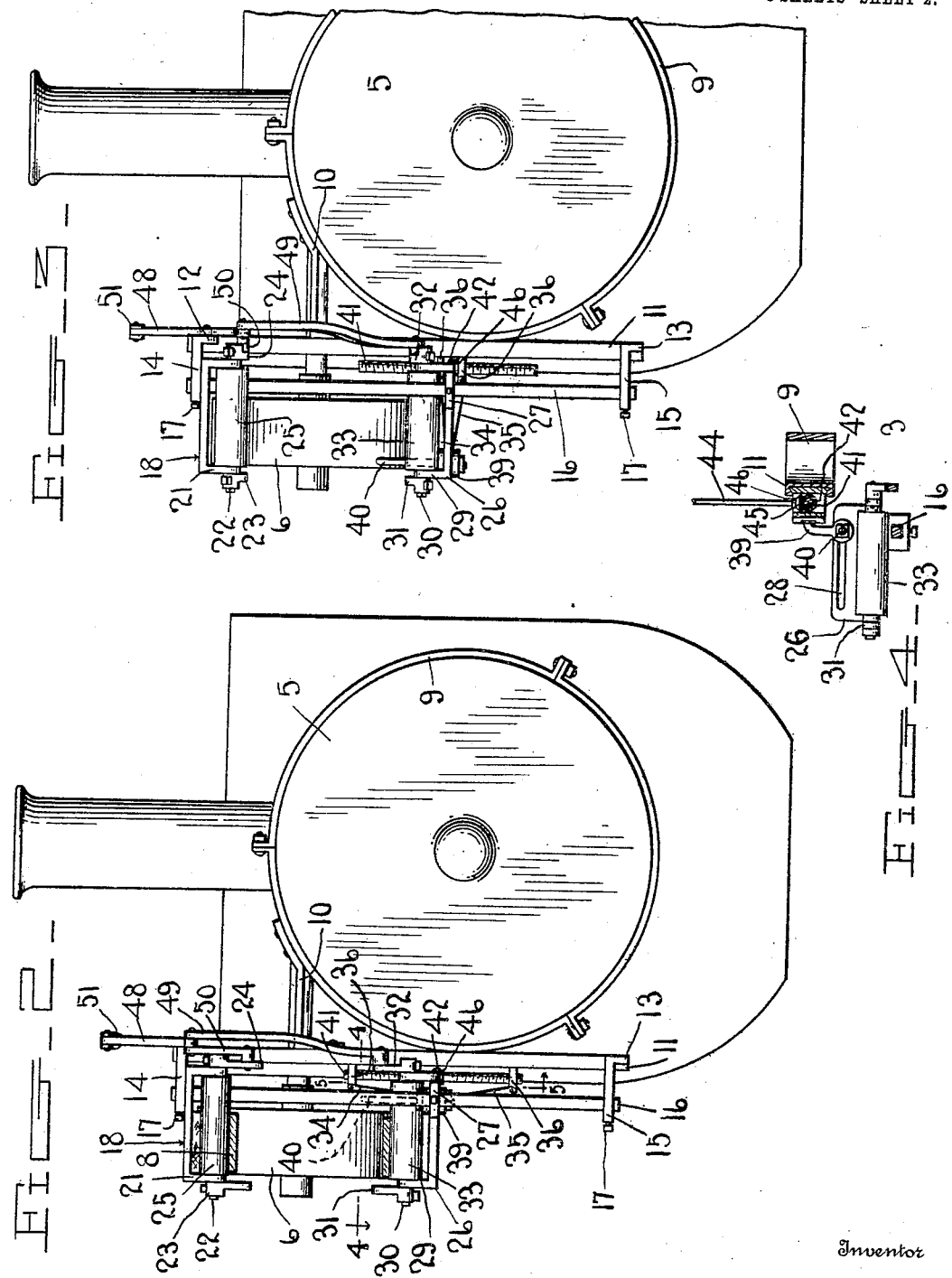
Witnesses
L. B. James
John A. Donegan
Inventor
Jesse E. Fisher
By 
Attorneys

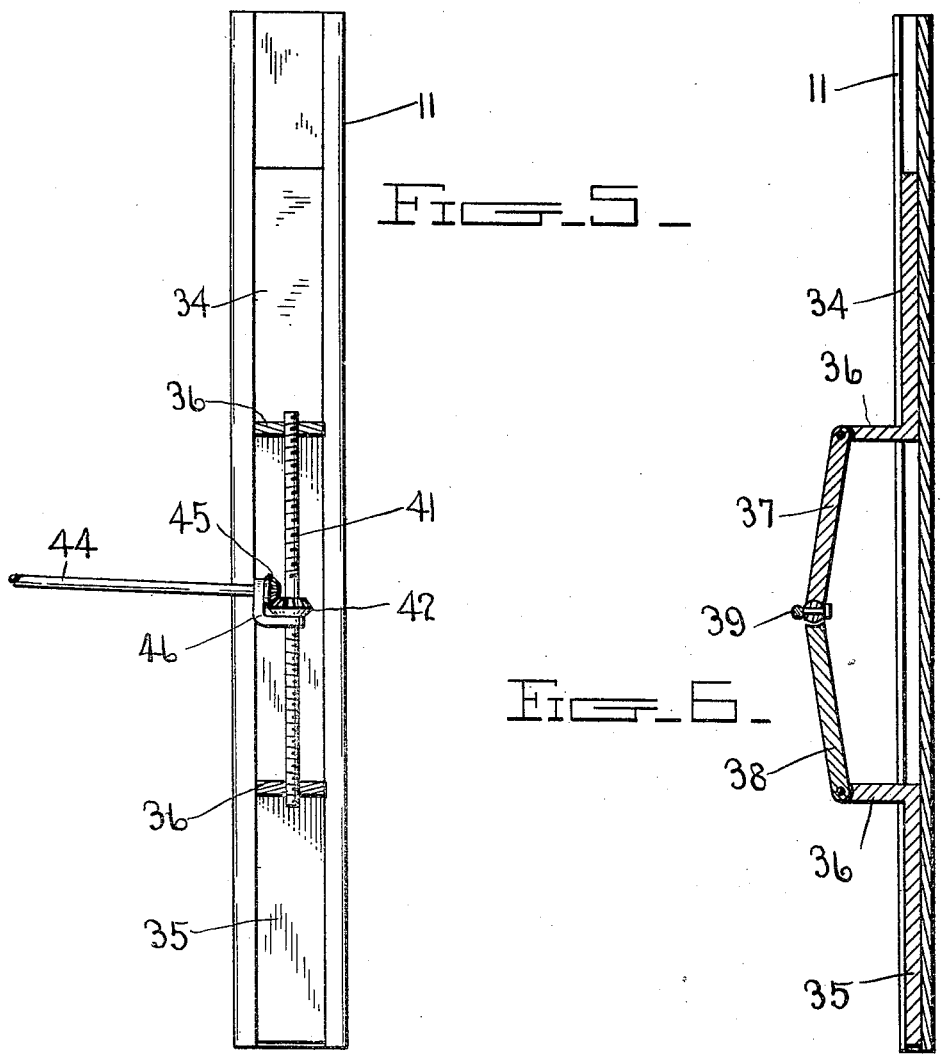

UNITED STATES PATENT OFFICE.

JESSE E. FISHER, OF LEMMON, SOUTH DAKOTA.

BELT-GUIDE.

954,618.  Specification of Letters Patent.  Patented Apr. 12, 1910.

Application filed May 18, 1909. Serial No. 496,748.

*To all whom it may concern:*

Be it known that I, JESSE E. FISHER, a citizen of the United States, residing at Lemmon, in the county of Perkins, State of South Dakota, have invented certain new and useful Improvements in Belt-Guides; and I do hereby declare the following to be a full, clear, and exact description of the invention, such as will enable others skilled in the art to which it appertains to make and use the same.

This invention relates to improvements in belt shifters, and more particularly to the type employed with harvesting machinery.

It is well known that considerable difficulty is experienced in maintaining the belt connection between an engine and harvesting machine in position. This is due to the fact that the vibration of both the engine and harvester tends to change the alinement between the two; and then again the belt used for connecting the pulley and fly-wheel is often of rubber and when wet slips and becomes disengaged from the pulley and fly wheel.

The present invention aims to remedy these defects by providing a device which will positively prevent the belt from leaving the fly wheel and pulley during the operation of the engine and machine.

Another object is the provision of a means for disengaging the belt from the fly wheel and pulley in an expeditious manner whenever desired and without any danger to the operator.

With these and other objects in view as will more fully hereinafter appear, the present invention consists in certain novel details of construction and arrangement of parts, hereinafter fully described, illustrated in the accompanying drawings and more particularly pointed out in the appended claims. It being understood that various changes in the form proportion, size and minor details of the device may be made without departing from the spirit or sacrificing any of the advantages of the invention.

In the accompanying drawings forming part of the specification:—Figure 1 is a side elevation of a boiler and engine equipped with my device and also showing a portion of a harvesting machine. Fig. 2 is a front end elevation of the device showing the position of the parts before the belt has been detached. Fig. 3 is a similar view showing the position of the parts after the belt has been detached. Fig. 4 is a plan view taken on the line 4—4, of Fig. 2 and showing the position of the belt detacher. Fig. 5 is a longitudinal section on the line 5—5 of Fig. 2 and showing the actuating mechanism for the belt detacher. Fig. 6 is a sectional end elevation taken on the line 6—6 of Fig. 1. Fig. 7 is a detailed longitudinal section of one of the rollers.

Similar numerals of reference are employed to designate corresponding parts throughout.

As shown in the drawings the numeral 5 designates the boiler, 6 the fly wheel and 7 the pulley of the machine to be driven.

8 is the belt connection between the pulley and fly wheel.

The boiler and engine in the present instance are shown to be of a portable type such as are usually transported from one farm to another during the harvesting. Encircling that portion of the boiler between its forward end and fly wheel 6 is a strap 9. This member is preferably formed of two or more sections which are bolted together as shown. Secured to that section of the strap disposed on the top and that side of the boiler on which the fly wheel 6 is disposed is one end of a bracket 10. This member is preferably formed of a single piece of metal corresponding in width and thickness to the strap sections and extends laterally of the boiler, to a point within the plane of the fly wheel 6 where it terminates in a downwardly turned extension which lies tangentially of the side of the boiler and strap 9.

Fixedly secured to the down-turned portion at the outer end of the bracket and strap 9 is what will subsequently be termed a guide 11. This member is preferably formed of a single piece of sheet metal, oblong in contour and having spaced strips on its outer face so as to constitute guides. This member is disposed tangentially to the side of the boiler and is of a length corresponding to the diameter of the fly-wheel 6, or approximately so. Projecting forwardly from the upper and lower end portions of the guide 11 are a pair of brackets 12 and 13 which extend parallel with the length of the boiler and the upper sides of which are provided with lateral lugs 14 and 15 which extend outwardly and at right-angles to the vertical plane of the boiler. These lugs are provided with alining openings which receive the opposite end portions of a standard 16, which is adjustably secured therein by means of set screws 17 entering the transverse openings formed in the lugs. Owing to the position of the parts just described they will lie a slight distance within the plane of the fly-wheel so as not to bear against the belt 8.

The standard 16 is adapted to support the rollers for the belt, these members are adapted to bear on the inner and outer faces of the belt and in the present instance are shown to be formed of wood mounted on brackets, the upper bracket is designated by the numeral 18 and is preferably formed of a single piece of flat metal, oblong in contour and provided on one side with a rearwardly extending lug 19 which is provided with an opening to receive the upper end portion of the standard. A set screw 20 is threaded into the lug and binds against the standard, whereby the bracket is adjustably secured thereon. The bracket extends at right-angles to the standard and at its opposite ends is provided with vertically extending perforated ears 21 which receive the opposite end portions of a shaft 22 journaled therein. The opposite ends of the shaft 22 project beyond the ears 21 and these end portions are squared. Keepers 23 and 24 are fixedly secured to the projecting ends of the shaft 22 and are each shown to consist of an oblong strip which is secured to the shaft by means of a set screw, whereby they may be adjusted longitudinally of the shaft. The distance between these keepers corresponds to the width of the belt to be used so that the latter will bear on their opposed inner faces and be prevented from displacement. Journaled on the shaft 22 and between the keepers 23 and 24 is a tubular roller 25 upon which the upper side of the belt 8 is adapted to bear.

The lower bracket is of different structure to the upper bracket and in the present instance is shown to consist of an oblong metallic plate 26 of slightly greater width than the upper bracket. This member is provided on its forward side and at its inner end with a forwardly extending lug 27 which is provided with an opening for the reception of the standard 16. A set screw is threaded into the lug and binds against the standard and serves as a means for fastening the bracket thereto. The plate is provided adjacent its rear side with a longitudinal slot 28 and is further provided at either end with up-standing lugs or ears 29 similar to the lugs or ears 21 of the upper bracket. These lugs or ears are disposed in advance of the slot 28 and adjacent the forward side of the plate and are adapted to receive the opposite ends of a shaft 30 which is journaled therein. The free ends of the shaft 30 extend in advance of the lugs 29 and terminate in squared portions on which are fitted a pair of keepers 31 and 32 similar to the keepers 23 and 24 but extending in an opposite direction to the last-named keepers. Journaled on the shaft 30 and between the ears or lugs 29 is a tubular roller 33, on which runs the belt 8 between the keepers 31 and 32 and which prevents the lower side of the belt from displacement. The rollers 25 and 33 lie in a vertical plane, or substantially so, and are arranged in the plane of the fly-wheel 6 and pulley 7. The lower roller 33 is so arranged on the plate 26 as to be in advance of the longitudinal slot 28.

Disposed within the guide 11 are a pair of slides 34 and 35 each of which correspond to one-fourth the length of the guide 11, or approximately so. The inner ends of these slides terminate in outwardly projecting lugs 36 which are arranged so as not to interfere with the movement of the slides; the lugs terminate in knuckles which interlock with the knuckles on the ends of a pair of links 37 and 38. The latter are preferably formed of pieces of sheet metal and at their outer ends are provided with interlocking knuckles which receive a pintle by means of which they are held together, the combined lengths of the slides and links when the latter are in a vertical position correspond approximately to the length of the guide. Thus it can be seen that the slides may be brought together, whereby the inner faces of the links will bear one upon the other and the links be disposed at a right-angle to the guide and when the slides are supported the links will assume a vertical position and be parallel with the guide. The links are so arranged that their forward sides lie adjacent the rear side of the plate 26 of the lower bracket, and swiveled in an opening at the outer sides of the interlocking ends of the links is the shank end of a substantially Y shaped carrier 39. The shank portion of this carrier is bent at right-angles and extends forwardly so that the limbs of the Y will straddle the lower bracket plate 26 and have their inner ends disposed over the longitudinal slot 28 of said plate. The inner end portions of the limbs of the carrier are provided with alining openings for the reception of a vertically disposed thrower 40 which extends through the longitudinal slot 28 of the lower bracket plate and bears on the edge of the belt. Thus it will be seen when the slides are brought together and the links forced outwardly the carrier will take the thrower to the outer end of the longitudinal slot and when the slides are operated and the links assume a vertical position the carrier and thrower will move to the opposite end of the slot 28. Thus it will be seen when the thrower is in the last-named position and the belt is running on the fly-wheel and pulley that by bringing the links and slides together as just described, the thrower engaging the end of the belt will force the latter bodily outward, whereby it will be disengaged from the fly-wheel and pulley, that is when the keepers are out of engagement with the sides of the belt, as will be presently described.

In order that the slide may be brought together mechanically and the thrower perform its function the following construction is employed: By referring now to the drawings it will be seen that a screw shaft 41 is threaded into the projecting lugs 36 of the slides, the opposite end portions of this screw shaft are provided with right and left threads, while the intermediate portion has keyed thereto a beveled pinion 42. Thus it will be seen when the pinion is turned and the shaft rotated the slides and links will operate, as before described. Secured to the outer face of the boiler and adjacent the rear end thereof is a bracket 43 and journaled in this bracket is one end of a rod 44, the opposite end of which extends to the guide 11 and is provided at this end with a beveled pinion 45, the teeth of which mesh with the pinion 42. In order to prevent displacement of the screw shaft 41 its intermediate portion directly beneath the pinion 42 is provided with a collar and encircling that portion of the shaft between the collar and lower face of a pinion is one end of a bracket 46, the opposite end of which extends rearwardly and encircles that portion of the rod 44 to the rear of the pinion 45. The bracket 46 may be made in any shape in order to establish this connection and thus it will be seen that owing to its engagement with the screw and rod that displacement of the former will be prevented. The opposite end of the rod 44 to the rear of the bracket 43 terminates in a hand wheel 47 which is within easy reach of the engine operator. Thus it can be seen when it is desired to throw the belt, it being understood that the thrower is at the inner end of the slot 28, all that will be necessary to do is to turn the hand wheel 47 in one direction, whereby the thrower through the medium of the carrier, links and the gear connection will move outwardly and disengage the belt from the pulley and fly-wheel.

In order that the keepers may be disengaged from the sides of the belt to permit the thrower to perform its function the following construction is employed: By referring now to the drawings it will be seen that secured to the inner face of the upper bracket 13 and extending in advance of the upper end of the guide is a bell crank lever 48, one arm of which extends forwardly and the other vertically upward, connection between the forwardly extending arm of the bell crank and the inner keeper 32 of the lower bracket is established by means of a connecting rod 49, the opposite ends of which are pivoted to the free end portions of the keeper and forwardly extending arm of the bell crank. A second rod 50 connects the inner keeper 24 of the upper bracket with the same arm of the bell crank lever and extending from the opposite arm of the bell crank lever is an operating rod 51, the rear end of which extends to a point within easy reach of the engine operator at the rear end of the boiler. This end of the rod is on its lower face provided with suitable notches or teeth 52 which engage a keeper 53, when the rod is moved, the upper keepers will be rocked out of engagement with the belt so also will the lower keepers be rocked from engagement with the sides of the belt. This will be the position of the parts when it is necessary to throw the belt from the fly wheel and pulley.

Thus it will be seen that I have provided a device which is exceedingly simple in structure and comparatively inexpensive to manufacture embodying few parts and these so arranged that the danger of derangement will be reduced to a minimum. It will be further seen that the parts are so arranged that they may be applied to most forms of boilers of this class, now in use.

Having thus described my invention what is claimed as new is:—

1. In a belt thrower, the combination with a standard; of brackets extending laterally from the upper and lower end portions of said standard, keepers carried by each of said brackets and means for turning said keepers in opposite directions and out of contact with the belt.

2. In a belt thrower, the combination with a standard; of brackets adjustably secured and extending laterally from the upper and lower end portions of said standard, a pair of spaced keepers carried by each of said brackets, and means for turning said keepers in opposite directions and out of contact with the belt.

3. In a belt thrower, the combination with a standard; of brackets adjustably secured and extending laterally from the upper and lower end portions of said standard, a pair of spaced keepers carried by each of said brackets, and means for simultaneously turning said keepers in opposite directions and out of contact with the belt.

4. In a belt thrower, the combination with a standard; of brackets extending laterally from the upper and lower end portions of said standard, horizontally disposed shafts journaled in said brackets and perpendicularly disposed keepers at the opposite ends of said shafts and means for turning said shafts so as to bring said keepers into and out of vertical position.

5. In a belt thrower, the combination with a standard; of brackets adjustably secured to and extending laterally from the upper and lower end portions of said standard, horizontally disposed shafts journaled in said brackets, perpendicularly disposed keepers fixedly secured to the opposite ends of said shafts and means for simultaneously turning said shafts to move said keepers into and out of vertical position.

6. In a belt thrower, the combination with a standard; of brackets adjustably secured to and extending laterally from the upper and lower end portions of said standard, horizontally disposed shafts journaled in said brackets and tubular rollers journaled on the intermediate portions of said shafts, perpendicularly disposed keepers at the opposite ends of said shafts and means for simultaneously turning said shafts to bring said keepers into and out of vertical position.

7. In a belt thrower, the combination with a support; of a guide connected to the support, slides lying in a vertical plane and disposed in the guide, laterally movable links connected with the slides, a vertically disposed and laterally movable thrower arranged in advance of the guide and a connection between the thrower and link connection.

8. In a belt thrower, the combination with a support; of a vertically disposed guide secured to the support, slides disposed in the guide, a laterally movable link connection between the slides, a vertically disposed and laterally movable thrower arranged in advance of the guide and a connection between the thrower and links.

9. In a belt thrower, the combination with a support; of a vertically disposed guide secured to the support, a pair of slides disposed in the guide, a pair of links connected together at one end and having their opposite ends pivoted to said slides, a vertically disposed and laterally movable thrower arranged in advance of the guide and a connection between the thrower and said links.

10. In a belt thrower, the combination with a support; of a vertically disposed guide connected with the support, a pair of slides disposed in the guide, a pair of links pivoted together at one end and having their opposite ends connected to the adjacent ends of the slides, a vertically disposed and laterally movable thrower arranged in advance of the guide and a carrier having one end swiveled in the pivoted ends of said links and its opposite end connected with said thrower.

11. In a belt thrower, a vertically disposed guide, a pair of slides disposed in said guide, a pair of links having their outer ends pivoted together and their inner ends secured to the opposed ends of said slides and a screw connected with said slides and serving to move the same to and from each other, whereby said links are folded and unfolded.

In testimony whereof, I affix my signature, in presence of two witnesses.

JESSE E. FISHER.

Witnesses:
C. R. BRAUGHT,
H. F. STEVENS.